United States Patent
Zhou et al.

(10) Patent No.: US 9,013,781 B2
(45) Date of Patent: Apr. 21, 2015

(54) INKS INCLUDING PIGMENTS HAVING TRI-BLOCK COPOLYMER GRAFTS

(75) Inventors: Zhang-Lin Zhou, Palo Alto, CA (US); Dick Henze, San Carlos, CA (US); Jun Yang, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/113,787

(22) PCT Filed: Apr. 29, 2011

(86) PCT No.: PCT/US2011/034447
§ 371 (c)(1),
(2), (4) Date: Oct. 24, 2013

(87) PCT Pub. No.: WO2012/148408
PCT Pub. Date: Nov. 1, 2012

(65) Prior Publication Data
US 2014/0063589 A1  Mar. 6, 2014

(51) Int. Cl.
| | | |
|---|---|---|
| G02B 26/00 | (2006.01) |
| G09G 3/34 | (2006.01) |
| C09B 67/00 | (2006.01) |

(Continued)

(52) U.S. Cl.
CPC ............. *G02F 1/167* (2013.01); *C01P 2002/86* (2013.01); *C09B 68/41* (2013.01); *C09C 1/3676* (2013.01); *C09C 1/3684* (2013.01); *C09C 1/3692* (2013.01); *C09C 1/56* (2013.01); *C09C 3/006* (2013.01); *C09C 3/10* (2013.01); *C09C 3/12* (2013.01); *C09D 11/037* (2013.01); *C09D 11/10* (2013.01)

(58) Field of Classification Search
USPC .................. 359/292–297; 345/107
See application file for complete search history.

(56) References Cited

U.S. PATENT DOCUMENTS

| | | | | |
|---|---|---|---|---|
| 7,230,750 B2 | 6/2007 | Whitesides | | |
| 2004/0006159 A1* | 1/2004 | Horie et al. | .................... | 523/160 |

(Continued)

FOREIGN PATENT DOCUMENTS

WO   WO-02093246   11/2002

OTHER PUBLICATIONS

Nguyen et al., 'Pigment Encapsulation by Emulsion Polymerization Using Macro-raft Copolymers,' Langmuir 24, No. 5, Published Jan. 16, 2008; on pp. 2140-2150.

(Continued)

*Primary Examiner* — Mohammed Hasan
(74) *Attorney, Agent, or Firm* — Hewlett-Packard Patent Department

(57) ABSTRACT

Pigment-based inks are provided. The inks include a non-polar carrier fluid and pigment particles suspended in the non-polar carrier fluid. The pigment particles have tri-block copolymer grafts. Each tri-block copolymer graft comprises a tri-block copolymer having three portions: an inner block attached to the pigment particle, a middle block, and an outer block, wherein the inner and outer blocks each contain bulky organic groups to help facilitate solubility of the functionalized polymers in the non-polar solvent and to provide steric stabilization of the resulting particle dispersion in the non-polar solvent, and wherein the middle block contains either acidic or basic functionalized side groups that facilitate charging of the pigment particle. A combination of an electronic display and an electronic ink employing the pigment and a process for making the pigment-based inks are also provided.

13 Claims, 8 Drawing Sheets

(51) Int. Cl.

| | |
|---|---|
| *C09C 1/36* | (2006.01) |
| *C09C 1/56* | (2006.01) |
| *C09C 3/00* | (2006.01) |
| *C09C 3/10* | (2006.01) |
| *C09C 3/12* | (2006.01) |
| *C09D 11/037* | (2014.01) |
| *C09D 11/10* | (2014.01) |
| *G02F 1/167* | (2006.01) |

(56) References Cited

U.S. PATENT DOCUMENTS

| | | |
|---|---|---|
| 2005/0018273 A1 | 1/2005 | Honeyman |
| 2005/0223938 A1 | 10/2005 | Tyvoll |
| 2006/0084720 A1* | 4/2006 | Tyvoll et al. ............... 523/160 |
| 2006/0178447 A1 | 8/2006 | Burns et al. |
| 2006/0211791 A1 | 9/2006 | Burns |
| 2008/0013155 A1 | 1/2008 | Honeyman |
| 2008/0177003 A1 | 7/2008 | Lee et al. |
| 2008/0194758 A1 | 8/2008 | Ma et al. |
| 2009/0229489 A1 | 9/2009 | Gu |
| 2012/0105938 A1* | 5/2012 | Liu et al. ................... 359/296 |
| 2012/0275012 A1* | 11/2012 | Zhou et al. ................. 359/296 |

OTHER PUBLICATIONS

International Search Report and Written Opinion, Korean IPO, Feb. 8, 2012, Hewlett-Packard Development Comapny, L.P., PCT Application No. PCT/US2011/034447.

\* cited by examiner

INKS INCLUDING PIGMENTS HAVING TRI-BLOCK COPOLYMER GRAFTS

BACKGROUND

Ultrathin, flexible electronic displays that look like print on paper are of great interest for potential applications in wearable computer screens, electronic paper, smart identity cards, store shelf labels and other signage applications. Electrophoretic or electrokinetic displays are an important approach to this type of medium. Electrophoretic/kinetic actuation relies on particles moving under the influence of an electric field, so the desired particles must exhibit good dispersibility and charge properties in non-polar dispersing media. Non-polar dispersing media are desirable because they help minimize the leakage currents in electrophoretic/kinetic devices.

Current commercial products based on electrophoretic display technology are only able to provide color and white states or black and white states. They cannot provide a clear, or transparent, state, which prevents use of a stacking architecture design. Such a stacking architecture of layered colorants would allow the use of transparent to colored state transitions in each layer of primary subtractive color to show print-like color in one display.

DETAILED DESCRIPTION

Figure 1:
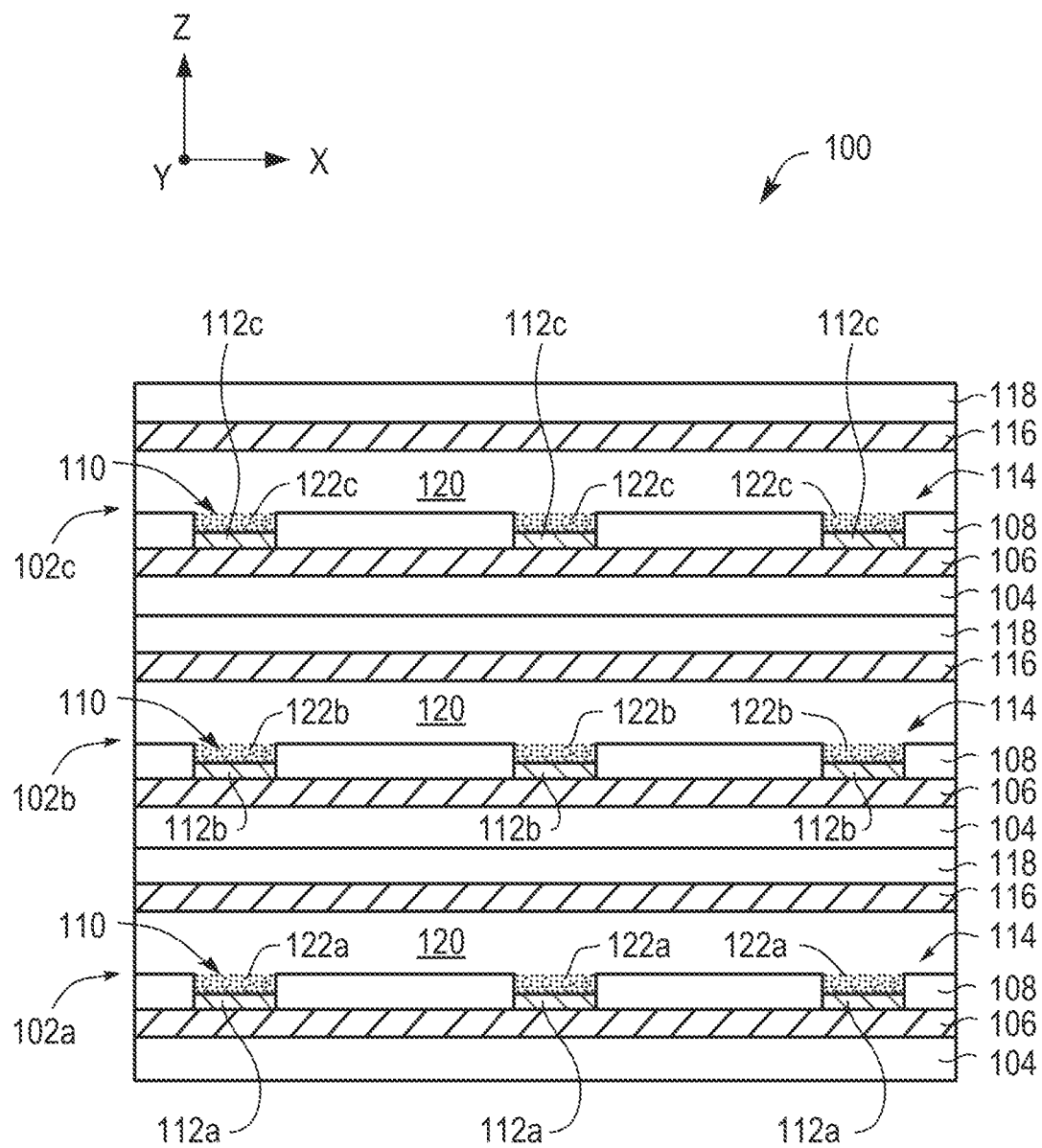
FIG. 1 depicts a cross-sectional view of an example of a stacked electro-optical display.

Aspects of the present invention were developed in relation to electronic inks, but the specification and claims are not so limited.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electronic ink display" is a display that forms visible images using one or more of electrophoresis, electro-convection, electro-osmosis, electrochemical interactions, and/or other electrokinetic phenomena.

The article 'a' and 'an' as used in the claims herein means one or more.

Bi-state and/or tri-state electrophoretic display cells (or elements) having a three-dimensional architecture for compacting charged colorant particles within the display cells are described in US Patent Publication 2010/0245981, published Sep. 30, 2010. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid. The ink fluid is colored by a dye, nanoparticle colorants, pigments, or other suitable colorants. A white state is achieved when the white particles are spread and held in proximity to the surfaces closest to the viewer, and a colored state is achieved when the white particles are compacted to allow absorption by the colorant fluid and subsequent reflection by a diffuse reflector in the back of the cell, or when the white particles are distributed throughout the colorant fluid to backscatter the light that has not been absorbed by the colorant fluid. By combining the white particles in the colored fluid with a different colored resin on the back of the display cell, a tri-state display cell is provided.

An electrophoretic display cell may include a three-dimensional architecture to provide a clear optical state. In this architecture, the geometrical shape of the display cell has narrowing portions in which electrophoretically/electrokinetically translated colorant particles collect and compact in response to appropriate bias conditions applied to driving electrodes on opposite sides of the display cell. The three-dimensional structure of the display cell introduces additional control of electrophoretically/electrokinetically moving colorant particles. As a result, desired functionalities can be achieved with a more stable electrophoretic/kinetic ink that resists irreversible agglomeration of the particles, but maintains its ability to both disperse and collect and compact the particles. The driving electrodes are passivated with a dielectric layer, thus eliminating the possibility of electrochemical interactions through the driving electrodes from direct contact with the electrophoretic ink. In other examples, the driving electrodes are not passivated, thus allowing electrochemical interactions with the electrophoretic/kinetic ink.

An example of a stacked device architecture is shown in FIG. 1. This configuration allows stacking of colored layers for electrophoretic/kinetic displays.

FIG. 1 illustrates a cross-sectional view of one example of stacked electro-optical display 100. Electro-optical display 100 includes a first display element 102a, a second display element 102b, and a third display element 102c. Third display element 102c is stacked on second display element 102b, and second display element 102b is stacked on first display element 102a.

Each display unit includes a first substrate 104, a first electrode 106, a dielectric layer 108 including reservoir or recess regions 110, thin layers 112, a display cell 114, a second electrode 116, and a second substrate 118. Display cell 114 is filled with a carrier fluid 120 with colorant particles 122. In some examples, thin layers 112 may be opaque. In other examples, thin layers 112 may be transparent.

First display element 102a includes thin layers 112a self-aligned within recess regions 110. First display element 102a also includes colorant particles 122a having a first color (e.g., cyan) for a full color electro-optical display.

Second display element 102b includes thin layers 112b self-aligned within recess regions 110. Second display element 102b also includes colorant particles 122b having a second color (e.g., magenta) for a full color electro-optical display.

Third display element 102c includes thin layers 112c self-aligned within recess regions 110. Third display element 102c also includes colorant particles 122c having a third color (e.g., yellow) for a full color electro-optical display. In other examples, colorant particles 122a, 122b, and 12c may include other suitable colors for providing an additive or subtractive full color electro-optical display.

In the example illustrated in FIG. 1, in the electro-optical display 100, first display element 102a, second display element 102b, and third display element 102c are aligned with each other. As such, thin layers 112a, 112b, and 112c are also aligned with each other. In this example, since recess regions 110 and self-aligned thin layers 112a, 112b, and 112c of each display element 102a, 102b, and 102c, respectively, are aligned, the clear aperture for stacked electro-optical display 100 is improved compared to a stacked electro-optical display without such alignment.

In an alternate example (not shown), first display element 102a, second display element 102b, and third display element 102c may be offset from each other. As such, thin layers 112a, 112b, and 112c are also offset from each other. In this example, since recess regions 110 and self-aligned thin layers 112a, 112b, and 112c are just a fraction of the total area of each display element 102a, 102b, and 102c, respectively, the clear aperture for stacked electro-optical display 100 remains high regardless of the alignment between display elements 102a, 102b, and 102c. As such, the process for fabricating stacked electro-optical display 100 is simplified. The self-aligned thin layers 112a, 112b, and 112c prevent tinting of each display element due to colorant particles 122a, 122b, and 122c, respectively, in the clear optical state. Therefore, a stacked full color electro-optical display having a bright, neutral white state and precise color control is provided.

As indicated above, this architecture enables both clear and colored states. However, developing electronic inks that work in this architecture has been challenging. The materials used in presently-available commercial products do not work in this architecture, since they do not provide clear states. Significant progress toward developing working electronic inks for this architecture has been made; see, e.g., PCT/US2009/060971 ("Electronic Inks"); PCT/US2009/060989 ("Dual Color Electronically Addressable Ink"); and PCT/US2009/060975 ("Electronic Inks"), all filed Oct. 16, 2009.

The foregoing discussion is directed primarily to stacked cells in an electro-optical display. However, the functionalized pigments disclosed herein may also be employed in lateral cells in an electro-optical display.

Figure 2:
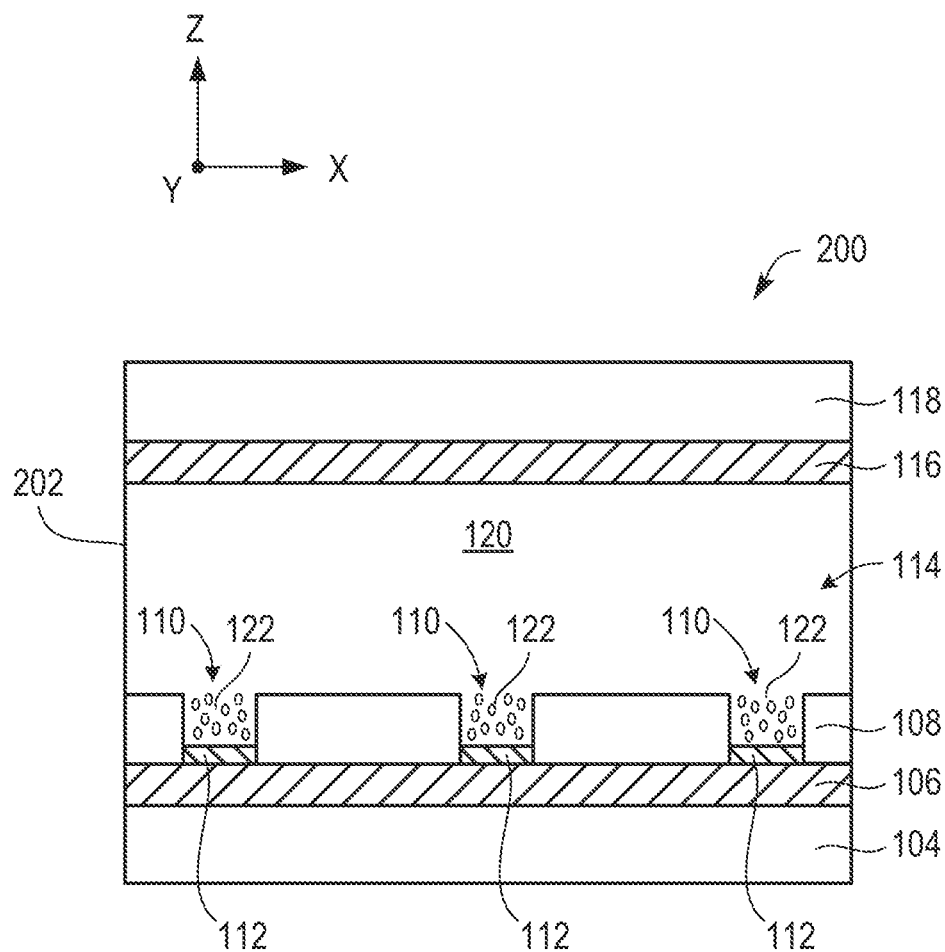
FIG. 2 illustrates a cross-sectional view of one example of a lateral electro-optical display.

FIG. 2 illustrates a cross-sectional view of one example of lateral electro-optical display 200. Electro-optical display 200 includes a display element 202a. Additional display elements may be disposed laterally in the x and y directions, as side-by-side sub-pixels or segments, with each display element containing inks having colorant particles 122 of different colors, or having black colorant particles that are collected to reveal patterned color filters or wavelength-selective reflectors below.

Each display element 202a is similar to electro-optical display 100a previously described and illustrated with reference to FIG. 1. Each display element 202a may include circular shaped thin layers 110a self-aligned within recess regions 108. Each display element 202a may also include colorant particles 122 having a color (e.g., cyan, magenta, yellow, black, or white) for a full color electro-optical display. In other examples, colorant particles 122 may include other suitable colors for providing an additive or subtractive full color electro-optical display.

In accordance with the teachings herein, novel stable inks, specifically, electronic inks, based on utilizing tri-block copolymers grafted onto pigment colorant particles are disclosed. Also disclosed are new methods of grafting particles with tri-block copolymers via surface initiated (living) polymerization techniques such as atom transfer radical polymerization (ATRP) or reversible addition-fragmentation chain transfer (RAFT). The particles grafted with these novel functionalized tri-block copolymers can be self-dispersed into non-polar solvents and supply both steric stabilization and particle charging functionality while minimizing the need for additional surfactants or charge directors.

These functionalized tri-block copolymers are designed to have three portions that are grafted to the particle or subsequent polymer ends in a step-wise fashion. The first and third blocks that comprise the inner and outer ends of the polymer chain respectively each contain bulky organic groups to help facilitate the solubility of such functionalized polymers in the solvent and provide a steric stabilization to the resulting particle dispersion. The second middle block portion of the polymer chain contains either acidic or basic functionalized side groups that facilitate charging of the particle. Such stable and charged particle dispersions can be used for a variety of applications such as pigments as colorants in electrophoretic/electrokinetic displays, particles to improve the bistability of anisotropic fluid electrophoretic displays (such as electrophoretic colorant particles in a liquid crystal host), and as field-addressable dielectric media for tuning the local index of refraction near an array of metallic nanostructures in order to tune the optical spectral response of plasmon resonance effect generated by the nanostructure array.

Conventional use of polymers to stabilize particle dispersions involves an equilibrium adsorption of polymer or surfactant molecules to the particle surface. In order to maintain an adequate amount of particle coverage, a relatively larger degree of free polymer must remain in the solvent to maintain equilibrium. This creates several challenges in electrophoretic systems. First, this polymer can form or modify the formation of reverse-micelle structures, significantly increasing the total charge in the system as a background species that is not directly associated with the particle charge. This excessive charge can lead to screening of insulated electrode systems and limit the extent of desired particle motion by nature of reducing the amplitude of the applied field that is present in the bulk fluid region. In exposed electrode systems, the free polymer can either be irreversibly damaged or contribute to corrosion of the electrodes, leading to lifetime—time limiting behaviors and switching degradation.

The disclosure herein provides methods of dispersing particles in non-polar solvents using novel functionalized tri-block copolymers grafted in a step-wise process. The resulting particle polymer encapsulation minimizes the need for additional surfactants or charge directors. Electronic inks based on such tri-block copolymer encapsulated particles are robust, because the tri-block copolymer composition is covalently bonded to the particle surfaces. The independent design of the various polymer blocks provides some design flexibility for the control of a stable particle dispersion and the charge characteristics for a particle species. This can have a positive influence on the switching speed performance and lifetime of electronic inks. Using this new technology, one can also make an electronic ink with both positively a charged colorant species and a negatively charged colorant species. In this manner, each species is a different color particle or pigment type which can be independently controlled in the same ink volume. The disclosed invention employs the designed steric stabilization feature of the polymer blocks to prevent agglomeration and precipitation of the oppositely charged colorant species.

ATRP (Atom Transfer Radical Polymerization) and RAFT (Reversible Addition-Fragmentation chain Transfer) are two surface-initiated living polymerization methods, also referred to as living polymerization methods, by which polymers can only be formed on a surface. In these methods, polymerization can only occur on an initiator group that must initially be located on the particle surface, and is subsequently transferred to the end of the just added polymer chain. There are publications in the scientific literature about the application of these methods to make new polymers, but none of them deals with grafting functional block copolymers onto a pigment surface.

In polymer chemistry, living polymerization is a form of addition polymerization where the ability of a growing polymer chain to terminate has been removed. This can be accomplished in a variety of ways. Chain termination and chain transfer reactions are absent and the rate of chain initiation is also much larger than the rate of chain propagation. The result is that the polymer chains grow at a more constant rate than seen in traditional chain polymerization and their lengths remain very similar (i.e. they have a very low polydispersity index). Living polymerization is a popular method for synthesizing block copolymers since the polymer can be synthesized in stages, each stage containing a different monomer. Additional advantages are predetermined molar mass and control over end-groups.

In ATRP, the uniform polymer chain growth, which leads to low polydispersity, stems from use of a transition metal-based catalyst. This catalyst provides an equilibrium between active, and therefore propagating, polymer and an inactive form of the polymer; known as the dormant form. Since the dormant state of the polymer is vastly preferred in this equilibrium, side reactions are suppressed. This equilibrium in turn lowers the concentration of propagating radicals, therefore suppressing unintentional termination and controlling molecular weights. ATRP reactions are very robust in that they are tolerant of many functional groups such as allyl, amino, epoxy, hydroxy, and vinyl groups present in either the monomer or the initator. ATRP methods may also be advantageous due to the ease of preparation, commercially available and inexpensive catalysts (copper complexes), pyridine based ligands and initiators (alkyl halides).

RAFT is a type of living polymerization involving a conventional radical polymerization in the presence of a reversible chain transfer reagent. Like other living polymerizations, there is no termination step in the RAFT process. It is a very versatile method to form low polydispersity polymer from monomers capable of radical polymerization. The reaction is usually done with a dithioester. The dithio compound must have a good homolytic leaving group, R, whose radical must be capable of initiating a polymerization reaction. There are four steps in raft polymerization: initiation, addition-fragmentation, reinitiation and equilibration.

The present invention describes a step-wise method of grafting novel functionalized tri-block copolymers onto a particle or pigment surface and the formulation of stable electronic inks based on this surface modified pigments. The structure of such tri-block copolymers is shown in Formula 1:

Formula 1

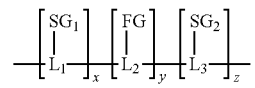

Tri-block copolymer wherein, $L_1$, $L_2$, and $L_3$ are each independently a covalent bond or chemical structure providing a covalent bond between different blocks, such as C—C, C=C, C=N, C≡C, or N=N, for example.

$SG_1$ and $SG_2$ each independently represent a solublizing and sterically bulky group, which helps to improve the solubility of the polymer and stabilize the nano-composite material; they can be any of alkyl groups, alkoxy groups, branched alkyl groups, branched alkoxy groups, or substituted aryl groups, for example.

FG represents a functional group that provides charges to pigment surfaces; it can be an acidic functional group such as carboxylate, a sulfonic acid, a phosphonic acid, or a phosphorous acid, for example, or, alternatively, it can be a basic group such as a primary amine, secondary amine, tertiary amine, pyridine, or imidazoline, for example.

The letters x, y and z are each independently an integer between 1 and about 5,000.

Formula 2 shows a general example of such tri-block copolymer that can be grafted onto pigment surfaces, in which three blocks are connected with carbon-carbon single bond.

Formula 2

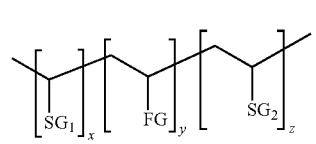

wherein, $SG_1$ and $SG_2$, FG, and x, y, and z are as described for Formula 1.

Examples of monomers that can be grafted as the inner and outer blocks to provide stabilizing functions are shown below:

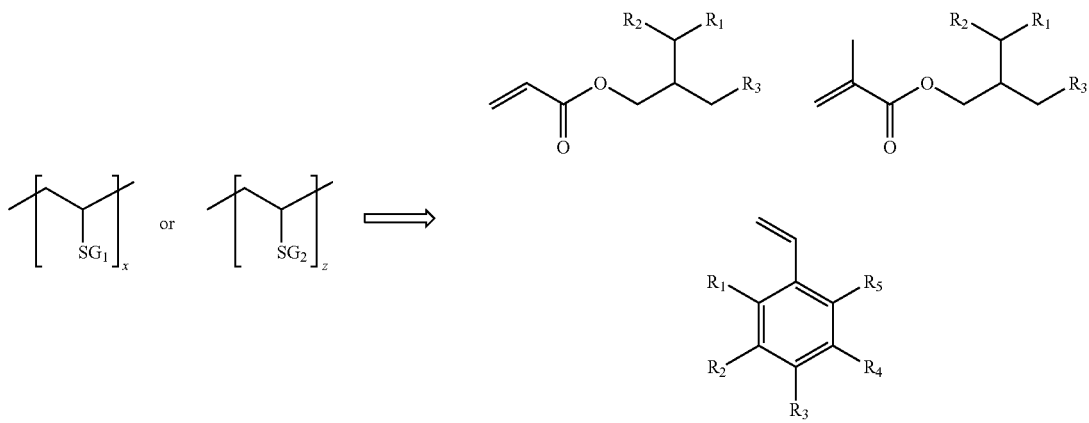

wherein $R_1$, $R_2$, $R_3$, $R_4$, and $R_5$ are independently selected from alkyl groups, alkoxy groups, branched alkyl groups, branched alkoxy groups, or substituted aryl groups, for example.

Examples of monomers that can be grafted as the middle block to provide charges to the pigment surfaces are shown below:

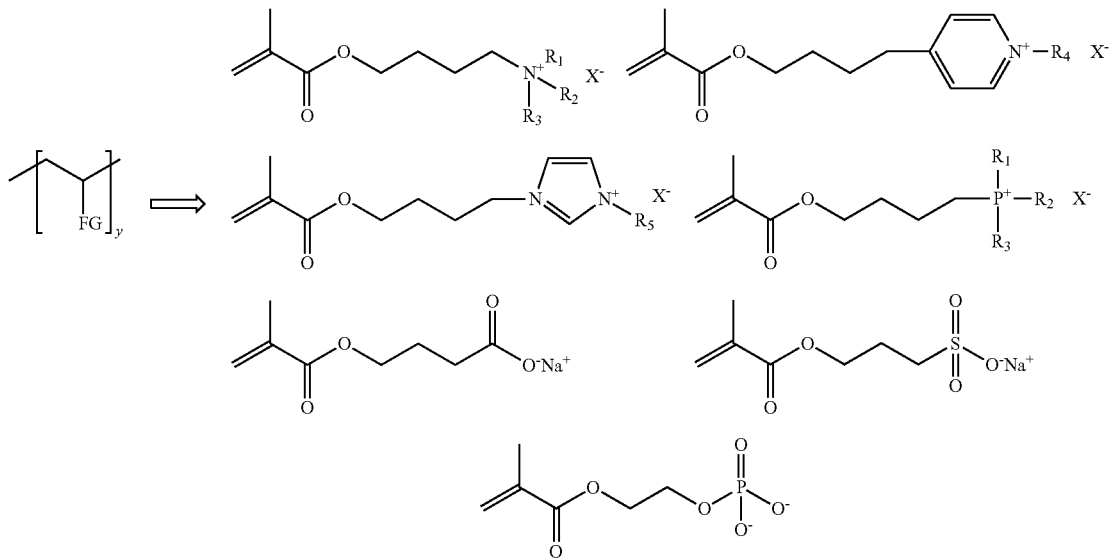

wherein $R_1$, $R_2$, $R_3$, $R_4$, and $R_5$ are as described above.

Figure 3A:
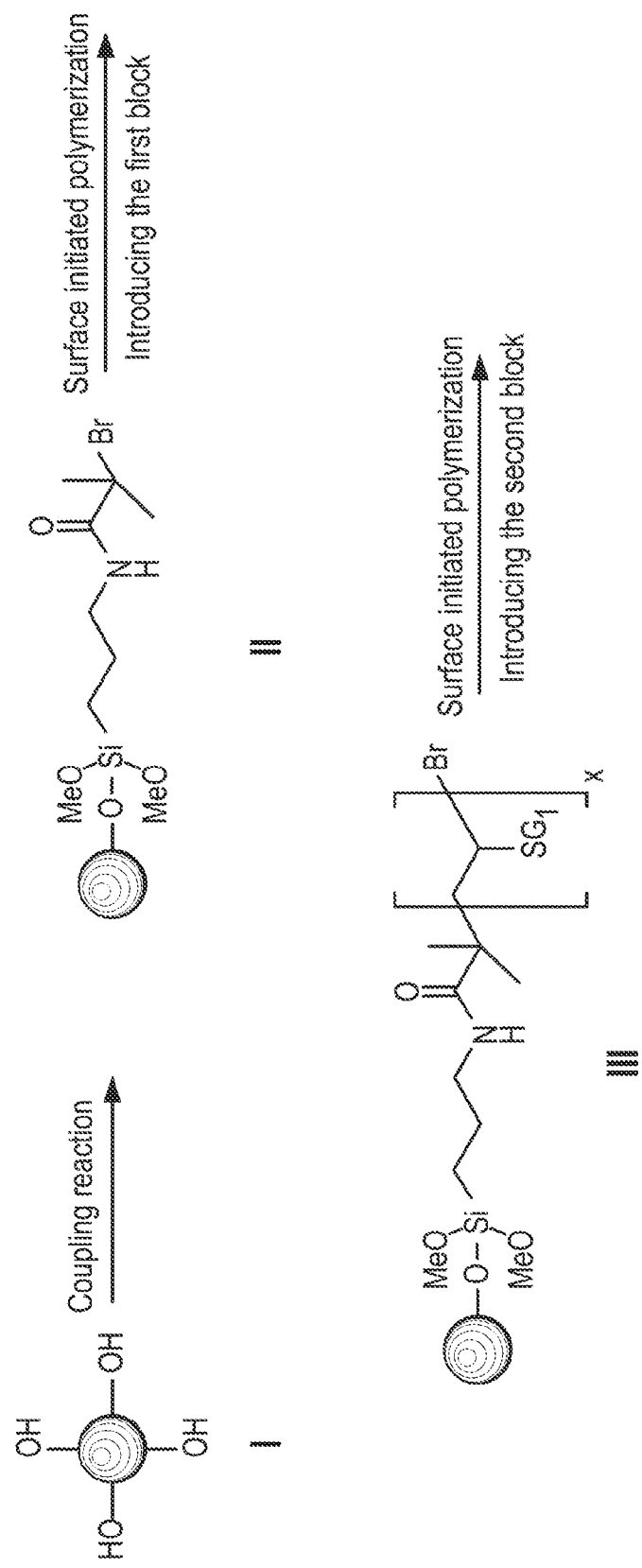
FIGS. 3A-3B depict an example of a process for grafting a functionalized tri-block copolymer onto pigment surfaces.
Figure 3B:
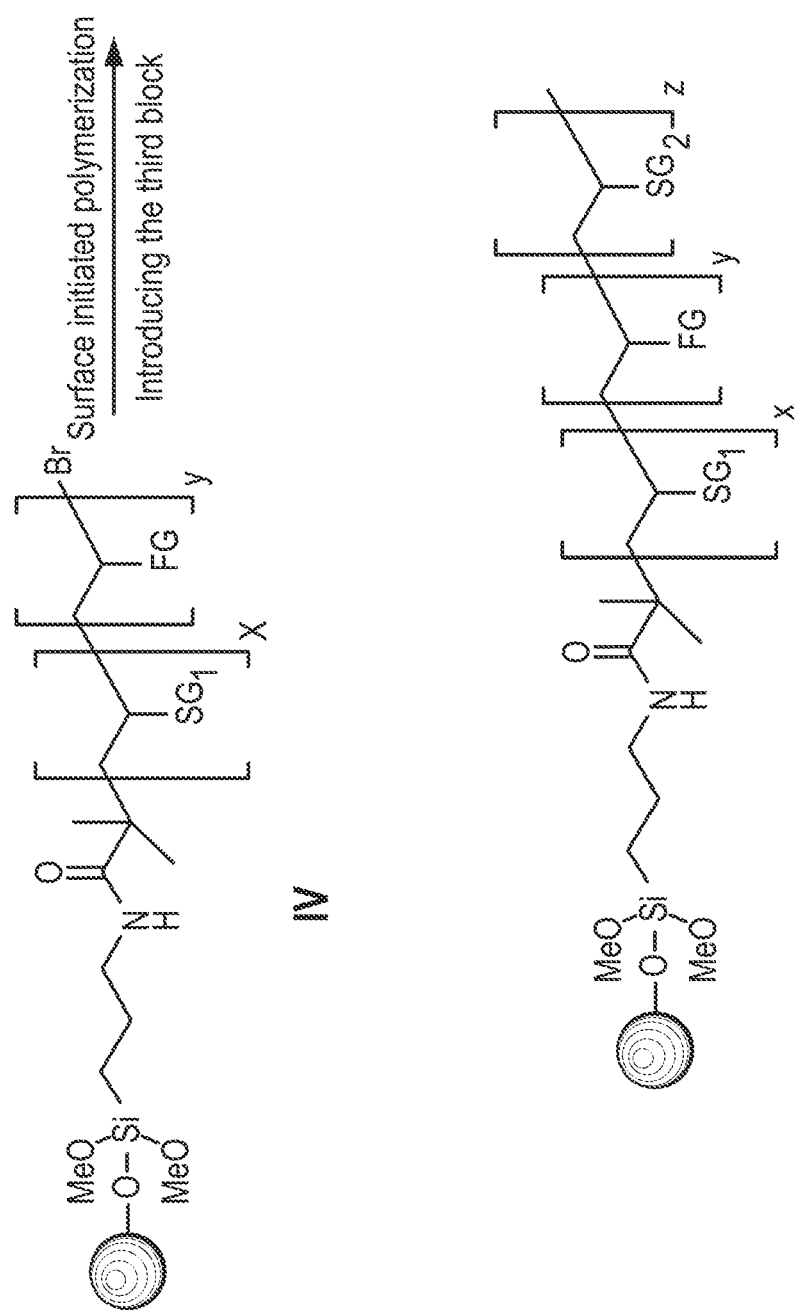

Shown in FIGS. 3A-3B is a process for grafting such functionalized tri-block copolymer onto pigment surfaces. The process is split into two figures for clarity. In FIG. 3A, a coupling reaction of inorganic pigments or metal oxide layer coated organic pigments I with a reactive initiator gives an initiator-linked pigment II, in this case, 2-bromo-2-methyl-N-[3-(trimethoxysilyl)propyl]-propanamide. However, the initiator may be any other ATRP surface initiators that can bind to OH group of the surface, such as, but not limited to, 2-bromo-2-methyl-N-[3-(triethoxysilyl)propyl]propanamide, 2-bromo-2-methyl-N-[3-(tiripropyloxysilyl)propyl] propanamide, 2-bromo-2-methyl-N-[3-(trichlorosilyl)propyl]propanamide, and 2-bromo-N-[3-(trimethoxysilyl)propyl]propanamide.

Besides ATRP, other common surface-initiated polymerization methods may be employed, such as nitroxide-mediated polymerization (NMP) and reversible addition-fragmentation chain transfer (RAFT) polymerization. For the NMP method, alkoxyamine initiators may be used. For the RAFT method, di-thioester chain transfer agents may be used as initiators. In any case, the rest of process, described below, is the same.

Pigment II undergoes the first surface initiated polymerization with the first block monomer to give the first block-grafted pigment III. Pigment III undergoes the second surface-initiated polymerization with the second block monomer to give two-block copolymer-grafted pigment IV (shown in FIG. 3B). In FIG. 3B, pigment IV undergoes the third surface-initiated polymerization with the third block monomer to give three-block copolymer-grafted pigment V. Such tri-block copolymer-grafted pigments can be mixed with other dispersants or charge directors to form charged and stable pigment dispersions for electronic ink applications.

In the reaction scheme depicted in FIGS. 3A-3B:
$SG_1$ and $SG_2$ are independently selected from alkyl groups, alkoxy groups, branched alkyl groups, branched alkoxy groups and substituted phenyl groups, for example.
FG is a binding group and may be any of primary amines, secondary amines, tertiary amines, amides, nitriles, isonitriles, cyanates, isocyanates, thiocyanates, isothiocyanates, azides, thiols, thiolates, sulfides, sulfinates, sulfonates, phosphates, hydroxyls, alcoholates, phenolates, carbonyls, carboxylates, phosphines, phosphine oxides, phosphonic acids, phosphoramides, and phosphates;
The letters x, y and z are each independently an integer between 1 and about 5,000.

Figure 4A:
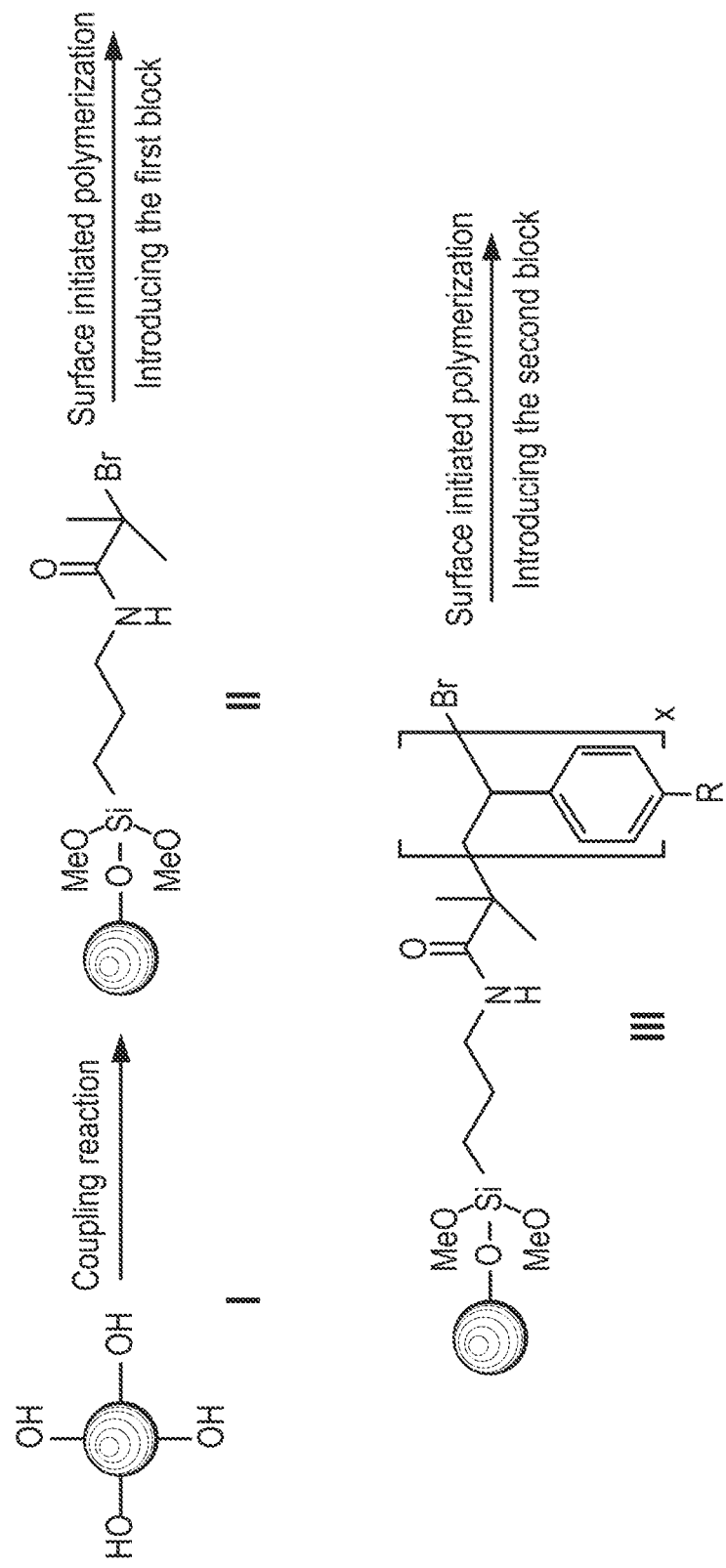
FIGS. 4A-4B depict a specific example of tri-block copolymer-grafted pigments that bear negative charges.
Figure 4B:
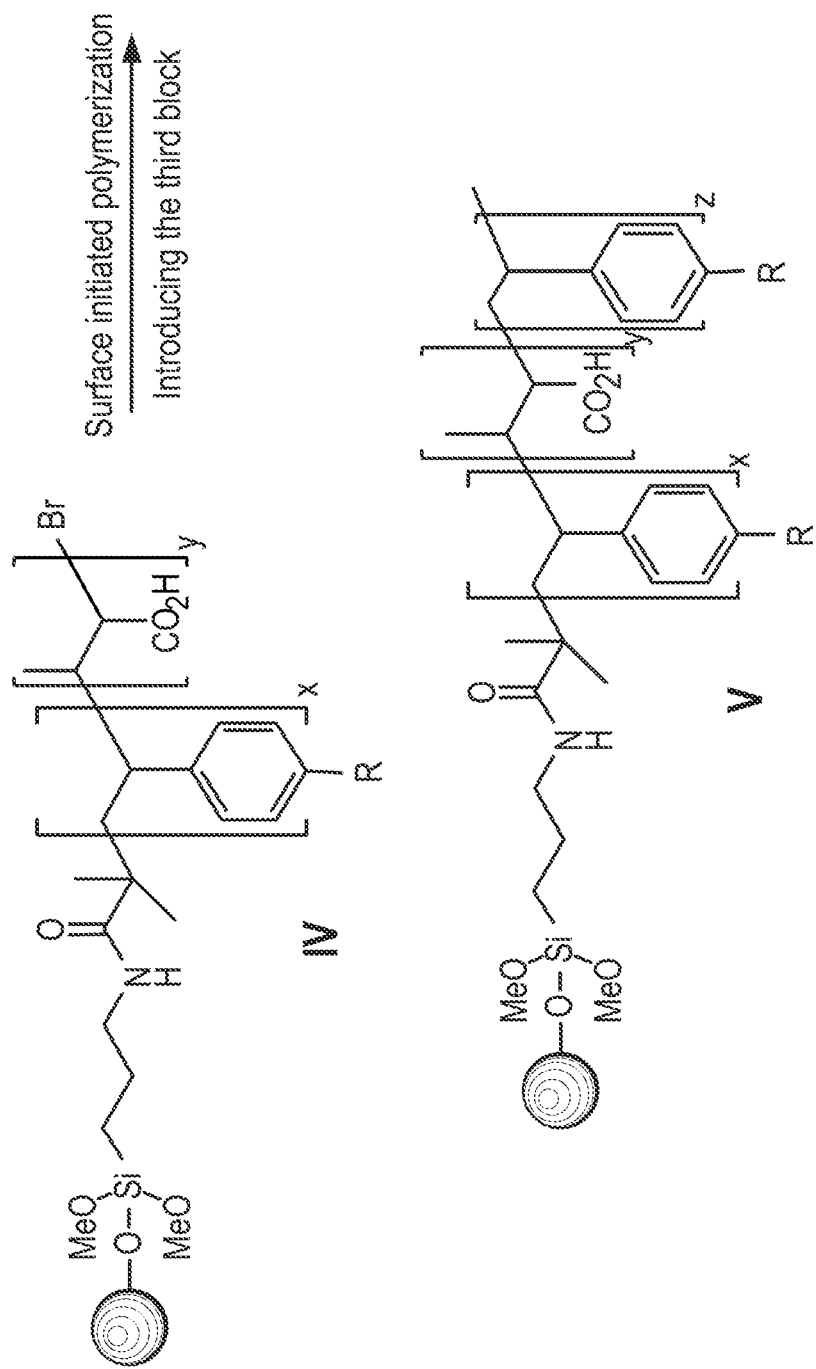

Shown in FIGS. 4A-4B is a specific example of such triblock copolymers grafted pigments that bear a negative charge. The process is split into two figures for clarity. In FIG. 4A, this example employs polyacrylic acid ammonium salts and polystylene based tri-block copolymers. A coupling reaction of inorganic pigments or metal oxide layer coated organic pigments I with a reactive initiator gives an initiator-linked pigment II. Pigment II undergoes the first surface initiated polymerization with the first block monomer—substituted styrenes to give the first block—polystyrene grafted pigment III. Pigment III undergoes the second surface initiated polymerization with the second block monomer—acrylic acid ammonium salts to give two-block polymers—polystyrene and polyacrylic acid grafted pigment IV (shown in FIG. 4B). In FIG. 4B, pigment IV undergoes the third surface initiated polymerization with the third block monomer substituted styrene to give three-block polymers—polystyrene, polyacrylic acid ammonium salts and polystyrene grafted pigment V. Such tri-block copolymer-grafted pigments can be mixed with other dispersants or charge directors to form positively charged and stable pigment dispersions for electronic ink applications.

In the reaction scheme depicted in FIGS. 4A-4B:
R represents a sterically bulky group, which helps to improve the solubility of the polymer and stabilize the nano-composite material, and may be any of alkyl groups, alkoxy groups, branched alkyl groups, and branched alkoxy groups.
The letters x, y and z are each independently an integer between 1 and about 5,000.

Figure 5A:
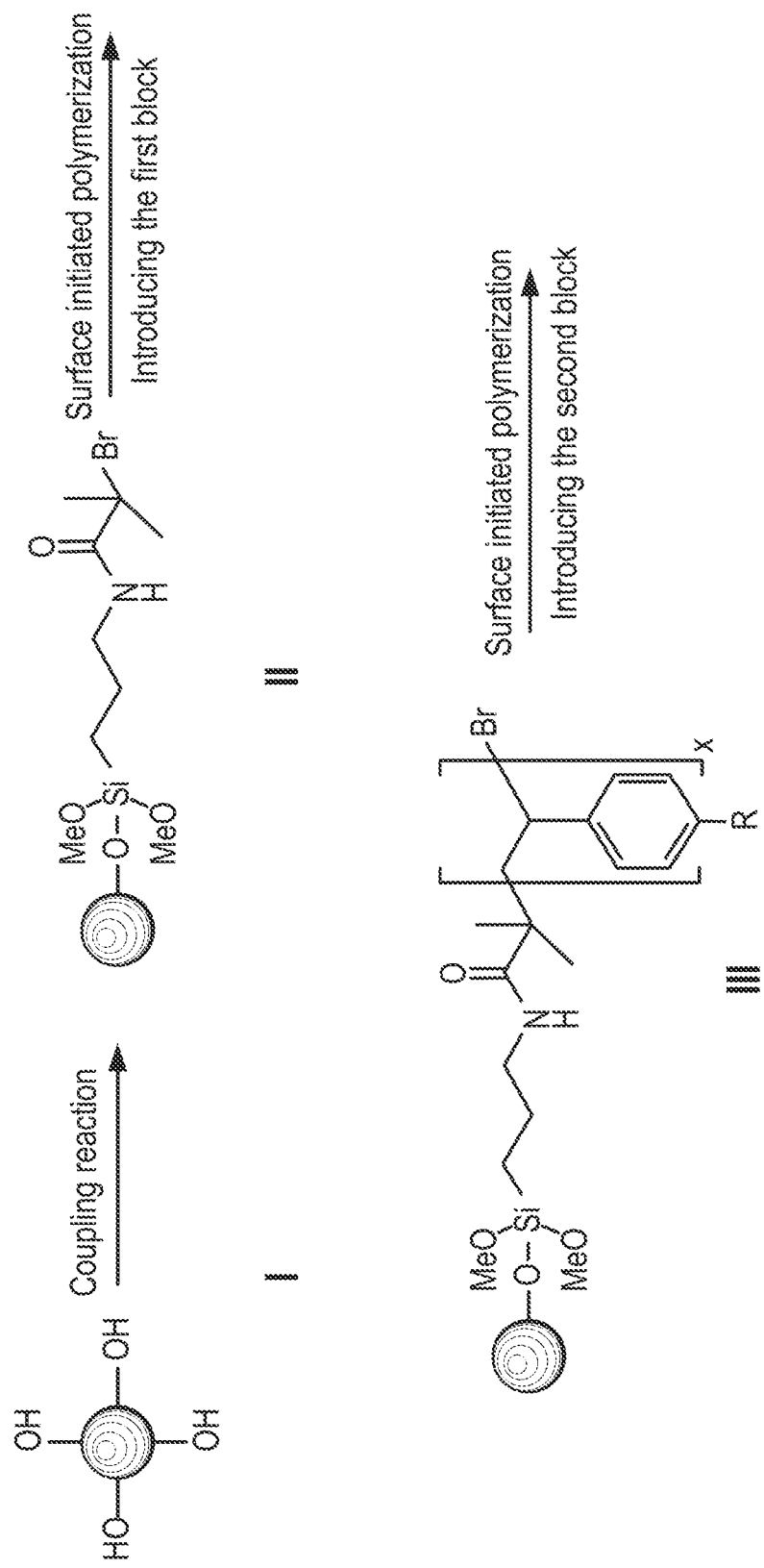
FIGS. 5A-5B depict a specific example of tri-block copolymer-grafted pigments that bear positive charges.
Figure 5B:
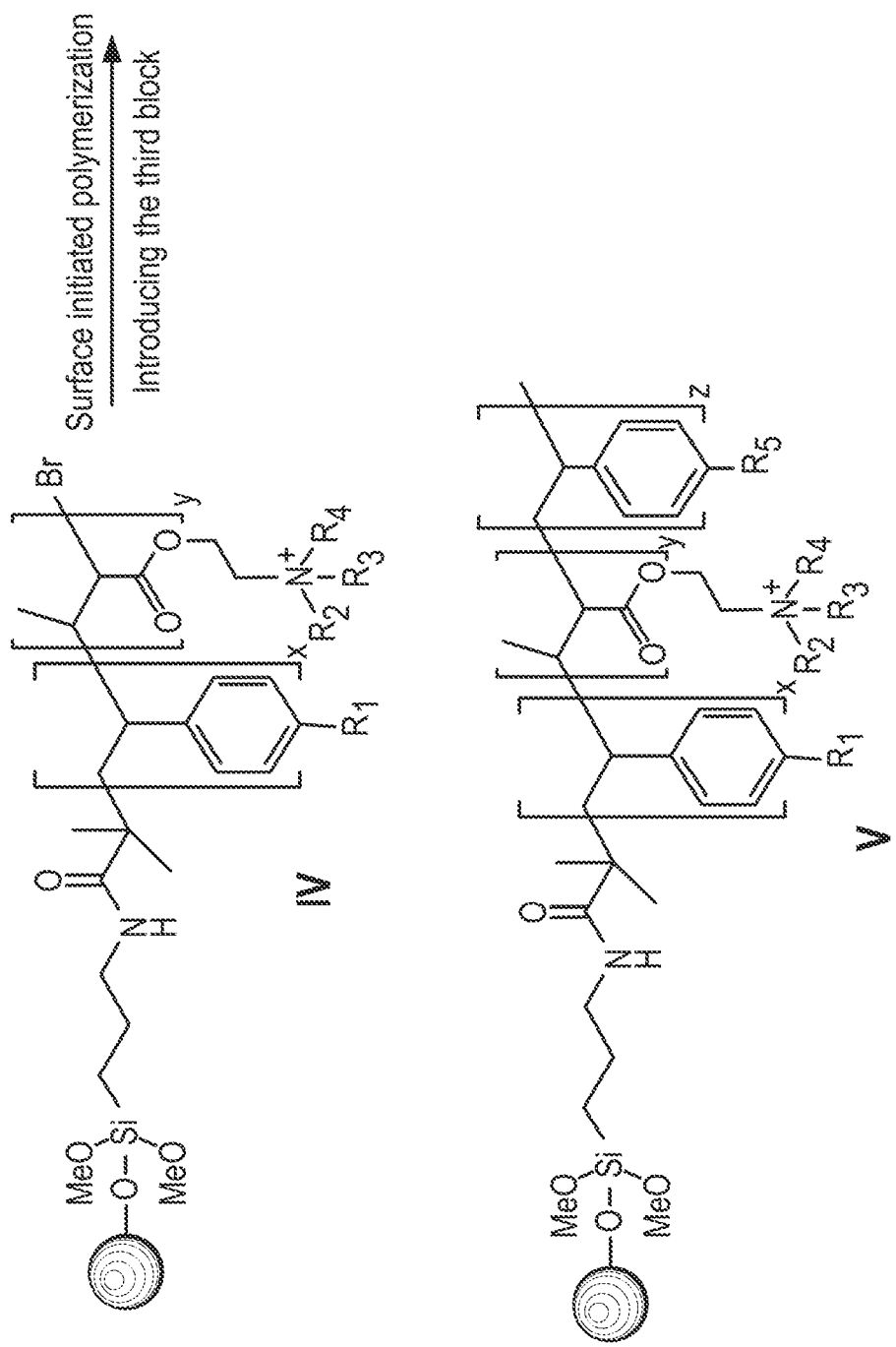

Shown in FIGS. 5A-5B is a specific example of such triblock copolymers grafted pigments that bear a positive charge. The process is split into two figures for clarity. In FIG. 5A, this example employs polyacrylic acid and polystylene based tri-block copolymers. A coupling reaction of inorganic pigments or metal oxide layer coated organic pigments I with a reactive initiator gives an initiator-linked pigment II. Pigment II undergoes the first surface initiated polymerization with the first block monomer—substituted styrenes to give the first block—polystyrene grafted pigment III. Pigment III undergoes the second surface initiated polymerization with the second block monomer—acrylic acid to give two-block polymers—polystyrene and polyacrylic acid grafted pigment IV (shown in FIG. 5B). In FIG. 5B, pigment IV undergoes the third surface initiated polymerization with the third block monomer—substituted styrene to give three-block polymers—polystyrene, polyacrylic acid and polystyrene grafted pigment V. Such tri-block copolymer-grafted pigments can be mixed with other dispersants or charge directors to form negatively charged and stable pigment dispersions for electronic ink applications.

In the reaction scheme depicted in FIGS. 5A-5B:
$R_1$, $R_2$, $R_3$, $R_4$ and $R_5$ represent sterically bulky groups, which helps to improve the solubility of the polymer and stabilize the nano-composite material, and may be any of alkyl groups, alkoxy groups, branched alkyl groups and branched alkoxy groups.
The letters x, y and z are an integer between 1 and about 5,000.

The reaction schemes depicted in FIGS. 3A-3B, 4A-4B, and 5A-5B are all directed to the ATRP method. However, in the discussion above regarding FIGS. 3A-3B, alternate surface-initiated polymerization methods were described (NMP and RAFT). Such alternate surface-initiated polymerization methods may also be employed in the reaction schemes depicted in FIGS. 4A-4B and FIGS. 5A-5B.

Turning now to electronic inks that employ the functionalized pigments discussed above, examples of such electronic inks generally include a non-polar carrier fluid (i.e., a fluid having a low dielectric constant k such as, e.g., less than about 20, or, in some cases, less than about 2). Such fluids tend to reduce leakages of electric current when driving the display, as well as increase the electric field present in the fluid. As used herein, the "carrier fluid" is a fluid or medium that fills up a viewing area defined in an electronic ink display and is generally configured as a vehicle to carry colorant particles therein. In response to a sufficient electric potential or field applied to the colorant particles while driving electrodes of the display, the colorant particles tend to move and/or rotate to various spots within the viewing area in order to produce a desired visible effect in the display cell to display an image. The non-polar carrier fluid includes, for example, one or more non-polar carrier fluids selected from hydrocarbons, halogenated or partially halogenated hydrocarbons, and/or siloxanes. Some specific examples of non-polar carrier fluids include perchloroethylene, cyclohexane, dodecane, mineral oil, isoparaffinic fluids, cyclopentasiloxane, cyclohexasiloxane, and combinations thereof.

The colorant particles are dispersed in the carrier fluid. As used herein, the term "colorant particles" refers to particles that produce a color, Some non-limiting examples of suitable colorant particles include the surface-modified pigment particles described above. In a non-limiting example, the colorant particles are selected from pigment particles that are self-dispersible in the non-polar carrier fluid. It is to be understood, however, that non-dispersible pigment particles may otherwise be used so long as the electronic ink includes one or more suitable dispersants. Such dispersants include hyperdispersants such as those of the SOLSPERSE® series manufactured by Lubrizol Corp., Wickliffe, Ohio (e.g., SOLSPERSE® 3000, SOLSPERSE® 8000, SOLSPERSE® 9000, SOLSPERSE® 11200, SOLSPERSE® 13840, SOLSPERSE® 16000, SOLSPERSE® 17000, SOLSPERSE® 18000, SOLSPERSE® 19000, SOLSPERSE® 21000, and SOLSPERSE® 27000); various dispersants manufactured by BYK-chemie, Gmbh, Germany, (e.g., DISPERBYK® 110, DISPERBYK® 163, DISPERBYK® 170, and DISPERBYK® 180); various dispersants manufactured by Evonik Goldschmidt GMBH LLC, Germany, (e.g., TEGO® 630, TEGO® 650, TEGO® 651, TEGO® 655, TEGO® 685, and TEGO® 1000); and various disperstints manufactured by Sigma-Aldrich, St. Louis, Mo., (e.g., SPAN® 20, SPAN® 60, SPAN® 80, and SPAN® 85).

In some examples, the concentration of pigment in the electronic ink ranges from about 0.5 to 20 percent by weight (wt %). In other examples, the concentration of the pigment ranges from about 1 to 10 wt %. In some examples, the concentration of dispersant in the electronic ink ranges from about 0.5 to 20 percent by weight (wt %). In other examples, the concentration of the dispersant ranges from about 1 to 10 wt %. The carrier fluid makes up the balance of the ink.

There is commonly a charge director employed in electronic inks. As used herein, the term "charge director" refers to a material that, when used, facilitates charging of the colorant particles. In an example, the charge director is basic and reacts with the acid-modified colorant particle to negatively charge the particle. In other words, the charging of the particle is accomplished via an acid-base reaction between the charge director and the acid-modified particle surface. It is to be understood that the charge director may also be used in the electronic ink to prevent undesirable aggregation of the colorant in the carrier fluid. In other cases, the charge director is acidic and reacts with the base-modified colorant particle to positively charge the particle. Again, the charging of the particle is accomplished via an acid-base reaction between the charge director and the base-modified particle surface.

The charge director may be selected from small molecules or polymers that are capable of forming reverse micelles in the non-polar carrier fluid. Such charge directors are generally colorless and tend to be dispersible or soluble in the carrier fluid.

In a non-limiting example, the charge director is selected from a neutral and non-dissociable monomer or polymer such as, e.g., a polyisobutylene succinimide amine, which has a molecular structure as follows:

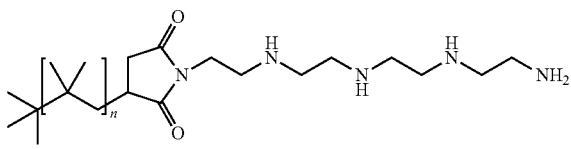

where n is selected from a whole number ranging from 15 to 100.

Another example of the charge director includes an ionizable molecule that is capable of disassociating to form charges. Non-limiting examples of such charge directors include sodium di-2-ethylhexylsulfosuccinate and dioctyl sulfo-succinate. The molecular structure of dioctyl sulfosuccinate is as follows:

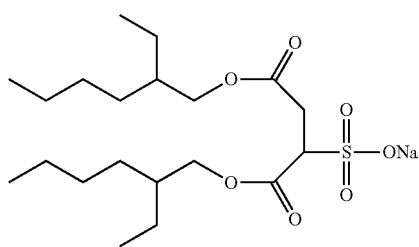

Yet another example of the charge director includes a zwitterion charge director such as, e.g., lecithin. The molecular structure of lecithin is as shown as follows:

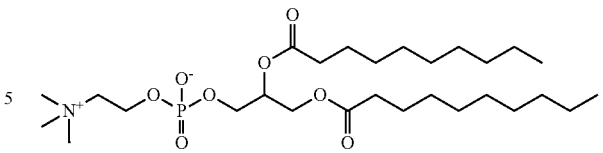

The foregoing discussion has been directed to the functionalization of $TiO_2$ pigment particles (white color). However, the teachings herein are equally applicable to other pigments, whether inorganic or organic, and of whatever color. Such inorganic and organic pigments are described further below, along with examples of different colors.

The pigment particles are selected from organic or inorganic pigments, and have an average particle size ranging from about 1 nm to about 10 μm. In some examples, the average particle size ranges from about 10 nm to about 1 μm. In other examples, the average particle size ranges from about 30 to 500 nm. Such organic or inorganic pigment particles may be selected from black pigment particles, yellow pigment particles, magenta pigment particles, red pigment particles, violet pigments, cyan pigment particles, blue pigment particles, green pigment particles, orange pigment particles, brown pigment particles, and white pigment particles. In some instances, the organic or inorganic pigment particles may include spot-color pigment particles, which are formed from a combination of a predefined ratio of two or more primary color pigment particles. To the extent that the generic pigments on the foregoing list can be functionalized as taught herein, such pigments may be used in the practice of the teachings herein. Likewise, to the extent that the following examples of specific pigments can be functionalized as taught herein, such pigments may be used in the practice of the teachings herein.

A non-limiting example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black 5150, Color Black 5160, Color Black 5170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Other examples of inorganic pigments include metal oxides and ceramics, such as the oxides of iron, zinc, cobalt, manganese, nickel. Non-limiting examples of suitable inorganic pigments include those from the Shephard Color Company (Cincinnati, Ohio) such as Black 100909A, Black 10P922, Black 1G, Black 20F944, Black 30C933, Black 30C940, Black 30C965, Black 376A, Black 40P925, Black 411A, Black 430, Black 444, Blue 10F545, Blue 10G511, Blue 10G551, Blue 10K525, Blue 10K579, Blue 211, Blue 212, Blue 214, Blue 30C527, Blue 30C588, Blue 30C591, Blue 385, Blue 40P585, Blue 424, Brown 10C873, Brown 10P835, Brown 10P850, Brown 10P857, Brown 157, Brown 20C819, Green 10K637, Green 187B, Green 223, Green 260, Green 30C612, Green 30C654, Green 30C678, Green 40P601, Green 410, Orange 10P320, StarLight FL 37, StarLight FL105, StarLight FL500, Violet 11, Violet 110, Violet 92, Yellow 10C112, Yellow 10C242, Yellow 10C272, Yellow 10P110, Yellow 10P225, Yellow 10P270, Yellow 196, Yellow 20P296, Yellow 30C119, Yellow 300236, Yellow 40P140, Yellow 40P280.

In addition to the foregoing inorganic pigments that may have their surfaces fluorinated as taught herein, the same teachings may be employed with organic pigments. The following is a list of organic pigments that may be treated in accordance with the teachings herein.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, Pigment Yellow 155, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Advantageously, the herein-disclosed methods of grafting particles with novel functionalized tri-block copolymers and their dispersion in non-polar solvents results in minimal need for additional surfactants or charge directors. The methods use a step-wise process to graft three different chemically-functionalized polymers consecutively onto the particle/polymer surface. Each block of these functionalized tri-block copolymers can be designed to optimize its intended function in the system based on the specific particle chemistry, solvent choice, and system requirement. For example, the inner block can be designed to provide the best compatibility to the particle surface chemistry while exhibiting adequate solubility in the non-polar solvent. The middle block can be designed to achieve the appropriate charge functionality in combination with the particle chemistry and other additives. The outer block can be designed to provide adequate steric stabilization to prevent agglomeration based on system requirements. For example, the outer block could be different for the same particle species in a single species ink compared to a dual species/charge system. Using this new technology, one can also make stable dual color electronic inks based on both positively charged particles and negatively charged particles, since the charges are separated by steric stabilizing groups, which prevents the agglomeration and precipitation of the two particle species due to the attraction of opposite charges.

The electronic inks based on such tri-block copolymers grafted to pigment particles are very stable, since the both the charge-producing and steric stabilization groups are covalently bonded to the pigment surface. This approach contributes to the robustness of the particle. Because there is minimal need to add additional surfactants to stabilize the ink, the final electronic ink will have low background charge, and as a result will exhibit less field screening effects which limit the clearing performance of electronic inks.

EXAMPLES

1. Synthesis of 3-(2-Bromoisobutyramido)propyl (trimethoxy)silane(BPS)

Into a 100 ml three-neck flask was charged with 4.29 g (23.93 mmol) of 3-aminopropyl trimethoxysilane and 50 ml of dichloromethane. The reactor was cooled to 0° C. in an ice/water bath and 5.00 g (21.75 mmol) of 2-bromoisobutyl bromide was added dropwise over a 30 min period. After the completion of addition, reaction mixture was stirred in ice/water bath for another 15 mins, then 2.42 g (23.92 mmol) of triethylamine was added giving a slurry solution. The white mixture was stirred overnight under nitrogen, warming to room temperature over that period. Salts were filtered out and the filtrate was washed with deionized (DI) $H_2O$ (100 ml×3). Drying over $MgSO_4$, filtration, and removal of the solvent gave yellowish oil (3.75 g, 53%).

$^1$H NMR ($CDCl_3$): δ0.67 (t, 2H, $SiCH_2$), 1.66 (m, 2H, $SiCH_2CH_2$), 1.95 (s, 6H, $CCH_3$) 3.28 (q, 2H, $CH_2NH$), 3.58 (s, 9H, $CH_3OSi$). $^{13}$C NMR ($CDCl_3$): $_δ$7.59 ($SiCH_2$), 22.5 ($SiCH_2CH_2$), 32.6 ($CCH_3$), 42.5 ($CH_2NH$), 50.6 ($CH_3OSi$), 63.2 ($CCH_3$), 171.9 (NHCO). Elemental analysis for $C_{10}H_{22}O_4NSiBr$: Br, 25.51. Found: Br, 25.20

2. Synthesis of initiator-coated $TiO_2$ nanoparticles

Into a 250 ml one-neck round bottom flask, $TiO_2$ nanoparticle (2 g, DuPont R960) was suspended in 80 ml methyl isobutyl ketone (MIRK) at room temperature for 1 hr. 3-(2-bromoisobutyramido)propyl(trimethoxy)silane (1.60 g, 4.87 mmol) was added afterwards and the solution was heated at reflux overnight. The excess BPS was removed through five cycles of centrifugation and resuspension in hexane. Excess solvent was removed under vacuum oven for a period of 24 hrs. The colloidal titanium initiator was obtained as pale yellowish powder (1.70, 85% yield; 2.62% Br).

3. ATRP of HMA from 2-bromoisobutyrate functional $TiO_2$ nanoparticles

Titanium colloidal initiator (200 mg, 0.06 mmol), Cu(I)Br (9.46 mg, 0.06 mmol) $Cu(II)Br_2$ (1.34 mg, 0.006 mmol) were added to a 25 ml Schlenk flask containing a magnetic stir bar. The flask was fitted with a rubber septum, and evacuated for a period of 1 h. The flask was then backfilled with nitrogen and evacuated again for 30 min, followed by additional backfilling with nitrogen. This evacuation/backfilling cycle was repeated at least 3 times. And then HMA (5.10 g, 30 mmol), which was freshly bubbled for 1 h with argon before use, was added to the flask via syringe. 0.015 ml (6.24 mg, 0.06 mmol) of N,N,N',N",N"-pentamethyldiethylenetriamine (PM-DETA) was finally added as ligand. The flask was placed in an oil bath at 80° C. and stirred for 45 min. Afterward, the reaction mixture was diluted with 15 ml toluene, and 10 ml of deionized water was added and stirred for 30 min in air for an extensive removal of catalyst. PHMA-grafted $TiO_2$ particles were isolated and purified by precipitation into an excess of methanol and recovered by centrifuge. TGA thermal analysis showed 19% weight loss.

4. Formulation of Electronic Inks Based on One-Block Polymer Grafted $TiO_2$ Nanoparticles A mixture of one-block polymer grafted $TiO_2$ particles (0.7 g), polyisobutylene succinic polyamine (0.35 g), and hyperdispersants (0.35 g) in 5.6 g of ISO-PAR® L (Exxon) was allowed to be sonicated for 60 min. The resulting white inks showed good performance with zeta potential of 36 mV.

5. Formulation of Electronic Inks Based on Untreated $TiO_2$ Nanoparticles

A mixture of one-block polymer grafted $TiO_2$, particles (0.7 g), polyisobutylene succinic polyamine (0.35 g), and hyperdispersants (0.35 g) in 5.6 g of ISO-PAR® L (Exxon) was allowed to be sonicated for 60 min. The resulting white inks aggregated after just 24 hours; it did not provide good switching performance, i.e. poor compaction and poor clearing.

6. Formulation of Electronic Inks Based on Untreated $TiO_2$ Nanoparticles

Into a 50 ml miffing bowl was added untreated $TiO_2$ nanoparticles (0.7 g) from Example 1, polyisobutylene succinic polyamine (0.35 g), hyperdispersants (0.35 g), 5.6 g of ISO-PAR®, and 50 µm milling beads (30 g). The mixture was allowed to mill for 60 min.

After cooling to room temperature, another 5.6 g of ISO-PAR L was added. The resulting mixture was sonicated for another 30 min. The miffing beads were filtered off to give 10% of functional white inks. The resulting inks aggregated after just 24 hours; it did not provide good switching performance, i.e. poor compaction and poor clearing.

The foregoing functionalized pigments have been described with specific application to electronic inks. However, the functionalized pigments may find use in other ink technologies that employ non-aqueous inks. An example of such other ink technology is liquid electrophoretic ink (LEP) used in commercial digital printers.

What is claimed is:
1. Pigment-based inks, including:
   a non-polar carrier fluid; and
   pigment particles suspended in the non-polar carrier fluid, the pigment particles having tri-block copolymer grafts, wherein each tri-block copolymer graft comprises a tri-block copolymer having three portions: an inner block attached to the pigment particle, a middle block, and an outer block, wherein the inner and outer blocks each contain bulky organic groups to help facilitate solubility of the functionalized polymers in the non-polar solvent and to provide steric stabilization of the resulting particle dispersion in the non-polar solvent, and wherein the middle block contains either acidic or basic functionalized side groups that facilitate charging of the pigment particle,
   wherein the tri-block copolymer has the following structure:

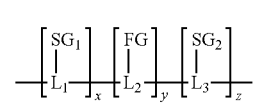

Tri-block copolymer wherein
   $L_1$, $L_2$, and $L_3$ are each independently a covalent bond or chemical structure providing a covalent bond between different blocks, selected from the group consisting of C—C, C═C, C═N, C≡C, and N≡N;
   $SG_1$ and $SG_2$ each independently represent a solubilizing and sterically bulky group, which helps to improve the solubility of the polymer and stabilize the nano-composite material, selected from the group consisting of alkyl groups, alkoxy groups, branched alkyl groups, branched alkoxy groups, and substituted aryl groups;
   FG represents a functional group that provides charges to pigment surfaces and is either an acidic functional group, selected from the group consisting of carboxylates, sulfonic acids, phosphonic acids, and phosphorous acids, or a basic group, selected from the group consisting of primary amines, secondary amines, tertiary amines, pyridine, or imidazoline; and the letters x, y and z are each independently an integer between 1 and about 5.000.

2. The inks of claim 1 wherein the non-polar carrier fluid is a non-polar solvent selected from the group consisting of hydrocarbons, halogenated or partially halogenated hydrocarbons, and siloxanes.

3. The inks of claim 2 wherein the non-polar solvent is selected from the group consisting of perchoroethylene, cyclohexane, dodecane, mineral oil, isoparaffinic fluids, cyclopentasiloxane, cyclohexasiloxane, cyclooctamethylsiloxane, and combinations thereof.

4. The inks of claim 1 wherein the pigment particles are either inorganic or metal oxide coated organic pigments and are selected from the group consisting of black pigment particles, yellow pigment particles, magenta pigment particles, red pigment particles, violet pigment particles, cyan pigment particles, blue pigment particles, green pigment particles, orange pigment particles, brown pigment particles, and white pigment particles.

5. The inks of claim 4 wherein the organic pigment particles are provided with a coating of silica and wherein the pigments have a particle size ranging from about 50 nm to 1 μm and wherein the coating has a thickness of up to about 200 nm.

6. The inks of claim 1, wherein the $SG_1$ and $SG_2$ groups are each independently selected from the group consisting of:

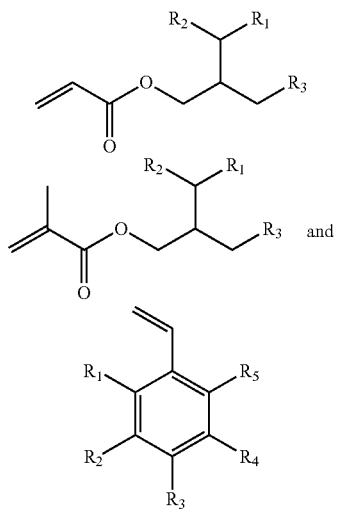

and wherein the FG group is selected from the group consisting of:

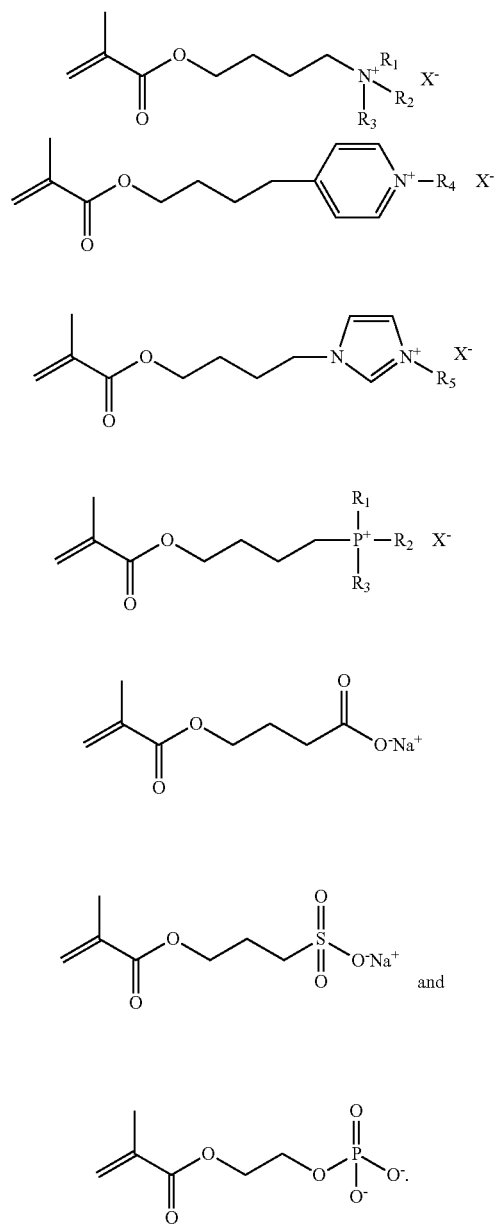

7. The inks of claim 6 wherein the tri-block polymer is selected fron the group consisting of

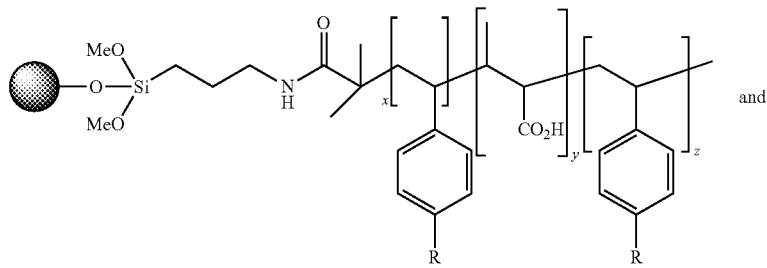

and

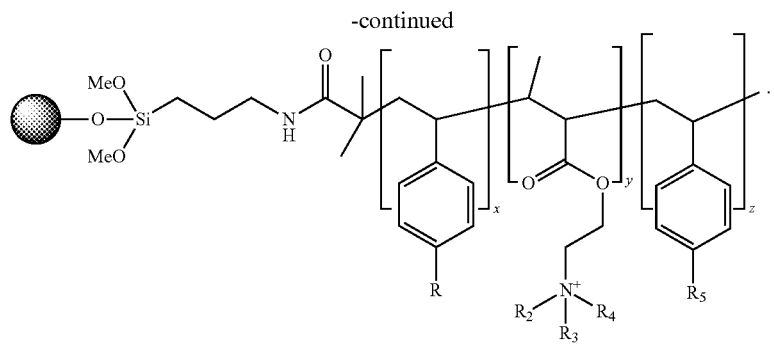

8. In combination, an electronic display and an electronic ink, wherein the electronic display includes:
- a first electrode;
- a second electrode; and
- a display cell defined by a dielectric material between the first electrode and the second electrode, the display cell containing the electron ink; and
- wherein the electronic ink comprises the pigment-based ink of claim 1.

9. The combination of claim 8 wherein the electronic display includes a plurality of display cells in a stacked configuration, associated first electrodes and second electrodes, and a plurality of electronic inks of different colors, each display cell containing an electronic ink of a different color.

10. A process for treating pigments for pigment-based inks, the process including:
- providing an inorganic pigment or an organic pigment with a metal oxide coating; and
- grafting tri-block copolymers on to the surface of the pigment using a surface-initiated polymerization technique, wherein a first, inner block is attached to the pigment particle, a second, middle block is attached to the first, inner block, and a third, outer block is attached to the second, middle block, wherein the inner and outer blocks each contain bulky organic groups to help facilitate solubility of the functionalized polymers in the non-polar solvent and to provide steric stabilization of the resulting particle dispersion in the non-polar solvent, and wherein the middle block contains either acidic or basic functionalized side groups that facilitate charging of the pigment particle,
- wherein the tri-block copolymer has the following structure:

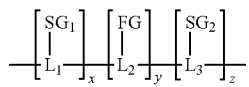

Tri-block copolymer wherein
- $L_1$, $L_2$, and $L_3$ are each independently a covalent bond or chemical structure providing a covalent bond between different blocks, selected from the group consisting of C—C, C=C, C=N, C≡C, and N=N;
- $SG_1$ and $SG_2$ each independently represent a solubilizing and sterically bulky group, which helps to improve the solubility of the polymer and stabilize the nano-composite material, selected from the group consisting of alkyl groups, alkoxy groups, branched alkyl groups, branched alkoxy groups, and substituted aryl groups;
- FG represents a functional group that provides charges to pigment surfaces and is either an acidic functional group, selected from the group consisting of carboxylates, sulfonic acids, phosphonic acids, and phosphorous acids, or a basic group, selected from the group consisting of primary amines, secondary amines, tertiary amines, pyridine, or imidazoline; and
- the letters x, y and z are each independently an integer between 1 and about 5.000.

11. The process of claim 10 wherein the surface-initiated polymerization technique is selected from the group consisting of Atom Transfer Radical Polymerization (ATRP), Reversible Addition-Fragmentation chain Transfer (RAFT) and Nitroxide-Mediated Polymerization (NM P).

12. The process of claim 10, wherein the $SG_1$ and $SG_2$ groups are each independently selected from the group consisting of:

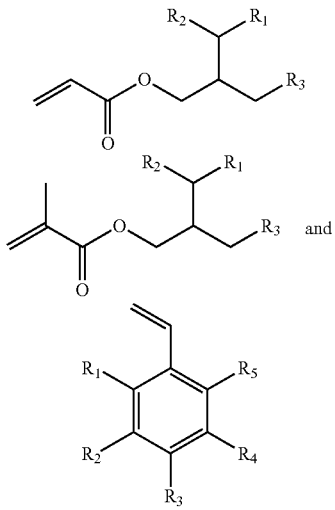

and wherein the FG group is selected from the group consisting of:

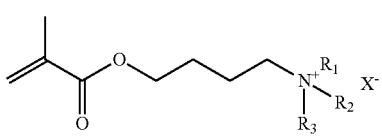

-continued

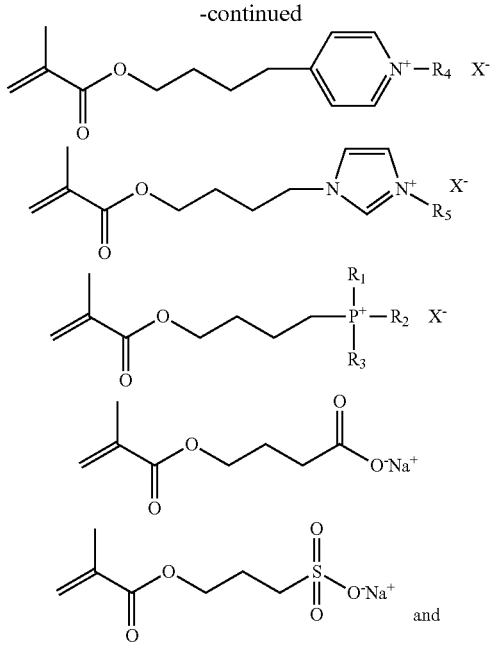

and

-continued

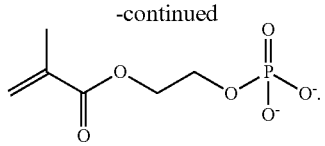

13. The process of claim 10 wherein:

a coupling reaction of inorganic pigments or metal oxide layer coated organic pigments with a reactive initiator gives an initiator-linked pigment;

the initiator-linked pigment undergoes a first surface-initiated polymerization with a first block monomer to give a first block-grafted pigment;

the first block-grafted pigment undergoes a second surface initiated polymerization with a second block monomer to give a two-block polymers grafted pigment; and the second block-grafted pigment undergoes a third surface initiated polymerization with a third block monomer to give pigment particles having the tri-block copolymer grafts.

* * * * *